US011809690B2

(12) United States Patent
Cheng et al.

(10) Patent No.: US 11,809,690 B2
(45) Date of Patent: Nov. 7, 2023

(54) HUMAN-COMPUTER INTERACTION METHOD AND APPARATUS, AND ELECTRONIC DEVICE

(71) Applicant: BEIJING BYTEDANCE NETWORK TECHNOLOGY CO., LTD., Beijing (CN)

(72) Inventors: Bin Cheng, Beijing (CN); Bixing Sheng, Beijing (CN); Chen Wang, Beijing (CN)

(73) Assignee: DOUYIN VISION CO., LTD., Beijing (CN)

(*) Notice: Subject to any disclaimer, the term of this patent is extended or adjusted under 35 U.S.C. 154(b) by 0 days.

(21) Appl. No.: 17/969,522

(22) Filed: Oct. 19, 2022

(65) Prior Publication Data

US 2023/0042757 A1 Feb. 9, 2023

Related U.S. Application Data

(63) Continuation of application No. PCT/CN2021/089911, filed on Apr. 26, 2021.

(30) Foreign Application Priority Data

Apr. 30, 2020 (CN) .......................... 202010366811.9

(51) Int. Cl.
G06F 3/0482 (2013.01)
G06F 3/0484 (2022.01)
G06F 3/04812 (2022.01)

(52) U.S. Cl.
CPC .......... G06F 3/0484 (2013.01); G06F 3/0482 (2013.01); G06F 3/04812 (2013.01)

(58) Field of Classification Search
CPC .................................................. G06F 3/048–05
See application file for complete search history.

(56) References Cited

U.S. PATENT DOCUMENTS

| 7,661,067 B2* | 2/2010 | Chen ................... H04L 12/1822 715/752 |
| 10,685,186 B2* | 6/2020 | Gu ........................ G06F 40/247 |
| 2001/0047626 A1* | 12/2001 | Ohkado .............. H04M 3/5183 49/506 |
| 2006/0123353 A1* | 6/2006 | Matthews ............. G06F 3/0481 715/779 |
| 2008/0313534 A1* | 12/2008 | Cheung ................ G06F 40/169 709/206 |

(Continued)

FOREIGN PATENT DOCUMENTS

| CN | 106406869 A | 2/2017 |
| CN | 107015746 A | 8/2017 |

(Continued)

*Primary Examiner* — Daniel Rodriguez
(74) *Attorney, Agent, or Firm* — BakerHostetler

(57) ABSTRACT

A human-computer interaction method and device, and an electronic device are provided. The method includes: displaying multimedia information in a display interface based on a multimedia data stream; and in response to a preset switching condition being satisfied, switching a display state of first communication information and adjusting a display state of a communication control, where the communication control is used for inputting communication information.

19 Claims, 10 Drawing Sheets

(56) References Cited

U.S. PATENT DOCUMENTS

| | | | |
|---|---|---|---|
| 2009/0113451 A1* | 4/2009 | Grigsby | G06F 9/542 719/318 |
| 2009/0307047 A1 | 12/2009 | Cook et al. | |
| 2010/0125811 A1* | 5/2010 | Moore | G06F 3/04817 715/846 |
| 2010/0242074 A1* | 9/2010 | Rouse | H04N 21/4788 709/204 |
| 2011/0029898 A1* | 2/2011 | Malik | H04M 3/53366 715/758 |
| 2011/0178854 A1* | 7/2011 | Sofer | H04N 21/25891 715/738 |
| 2012/0023113 A1* | 1/2012 | Ferren | G06F 16/9535 707/E17.084 |
| 2013/0212466 A1* | 8/2013 | Khalatian | G06F 3/0481 715/753 |
| 2014/0280564 A1* | 9/2014 | Darling | H04L 51/52 709/204 |
| 2015/0339006 A1* | 11/2015 | Chaland | G06F 3/048 715/835 |
| 2016/0259526 A1* | 9/2016 | Lee | H04L 51/04 |
| 2017/0336960 A1* | 11/2017 | Chaudhri | H04L 51/18 |
| 2018/0074661 A1* | 3/2018 | Zhao | G10L 15/08 |
| 2018/0136794 A1* | 5/2018 | Cassidy | G06F 3/0488 |
| 2018/0181286 A1* | 6/2018 | McKay | G06F 3/04886 |
| 2018/0356957 A1* | 12/2018 | Desjardins | H04L 51/04 |
| 2019/0079644 A1* | 3/2019 | Kim | G06N 20/00 |
| 2020/0301566 A1* | 9/2020 | Monk | G06F 17/10 |
| 2021/0158594 A1* | 5/2021 | Huang | H04N 21/854 |
| 2022/0050582 A1* | 2/2022 | Zhou | G06F 3/0482 |

FOREIGN PATENT DOCUMENTS

| | | |
|---|---|---|
| CN | 108495165 A | 9/2018 |
| CN | 110225384 A | 9/2019 |
| CN | 112306224 A | 2/2021 |

\* cited by examiner

HUMAN-COMPUTER INTERACTION METHOD AND APPARATUS, AND ELECTRONIC DEVICE

CROSS REFERENCE TO RELATED APPLICATION

The present application is a continuation of International Patent Application No. PCT/CN2021/089911, filed on Apr. 26, 2021, which claims priority to Chinese Patent Application No. 202010366811.9, titled "HUMAN-COMPUTER INTERACTION METHOD AND APPARATUS, AND ELECTRONIC DEVICE", filed on Apr. 30, 2020, both of which are incorporated herein by reference in their entireties.

TECHNICAL FIELD

Embodiments of the present disclosure relate to the field of computer technologies, and in particular, to a human-computer interaction method, a human-computer interaction device, and an electronic device.

BACKGROUND

In practice, a terminal may display multimedia information contained in a multimedia data stream. In a process of displaying the multimedia information, different users may publish communication information. It is not difficult to understand that the communication information may be information published when the user communicates.

In the related art, a terminal device may display the communication information published by users in a display interface of the multimedia information.

SUMMARY

This summary is provided to introduce concepts in a simplified form, the concepts are described in detail in the detailed description of the embodiments below. This summary is not intended to identify key features or essential features of the claimed technical solution, nor is it intended to be used to limit the scope of the claimed technical solution.

A human-computer interaction method, a human-computer interaction device, and an electronic device are provided according to embodiments of the present disclosure, to improve a display flexibility of first communication information.

In a first aspect, a human-computer interaction method is provided according to an embodiment of the present disclosure. The method includes: displaying multimedia information in a display interface based on a multimedia data stream; and in response to a preset switching condition being satisfied, switching a display state of first communication information and adjusting a display state of a communication control, where the communication control is used for inputting communication information.

In a second aspect, a human-computer interaction device is provided according to an embodiment of the present disclosure. The device includes: a first displaying unit, configured to display multimedia information in a display interface based on a multimedia data stream; and a switching unit, configured to, in response to a preset switching condition being satisfied, switch a display state of first communication information and adjust a display state of a communication control, where the communication control is used for inputting communication information.

In a third aspect, an electronic device is provided according to an embodiment of the present disclosure. The electronic device includes one or more processors and a storage apparatus storing one or more programs. The one or more programs, when executed by the one or more processors, cause the one or more processors to perform the human-computer interaction method described in the above first aspect.

In a fourth aspect, a computer-readable medium is provided according to an embodiment of the present disclosure. The computer-readable medium stores a computer program. The computer program, when executed by a processor, causes the processor to perform the human-computer interaction method described in the above first aspect.

According to the human-computer interaction method, the human-computer interaction device, and the electronic device provided in the embodiments of the disclosure, the multimedia information may be displayed in a display interface based on a multimedia data stream. It may also be determined whether the preset switching condition is satisfied. Further, in response to the preset switching condition being satisfied, the display state of the first communication information may be switched, and the display state of the communication control may be adjusted. Therefore, by switching the display state of the first communication information, the display flexibility of the first communication information is improved.

BRIEF DESCRIPTION OF THE DRAWINGS

With reference to the drawings and specific embodiments below, the above and other features, advantages and aspects of embodiments of the present disclosure become more apparent. Throughout the drawings, the same or similar reference numerals indicate the same or similar elements. It should be understood that the drawings are schematic, and components and elements are unnecessarily drawn in scale.

DETAILED DESCRIPTION OF THE EMBODIMENTS

Embodiments of the present disclosure are described in detail hereinafter with reference to the drawings. Although the drawings show some embodiments of the present disclosure, it should be understood that the present disclosure may be implemented by various embodiments and are not limited to be implemented by the embodiments clarified herein. The embodiments described in the present disclosure are intended to illustrate the present disclosure thoroughly and completely. It should be understood that the drawings and the embodiments are only schematic, and are not intended to limit the protection scope of the present disclosure.

It should be understood that, steps described in the method embodiments of the present disclosure may be performed in different orders and/or performed in parallel. In addition, the method embodiments may include additional steps and/or the shown steps may be omitted. The scope of the present disclosure is not limited thereto.

Term "including" and variations thereof adopted herein is inclusive, that is "including but not limited to". The term "based on" means "at least partially based on". The term "an embodiment" means "at least one embodiment", and the term "another embodiment" means "at least one another embodiment". The term "some embodiments" means "at least some embodiments". Definitions of other terms are provided below.

It should be noted that, the terms "first" "second" and so on mentioned in the present disclosure are only used to distinguish different apparatuses, modules or units, rather than limit an order of functions performed by the apparatus, module or unit or limit interdependence.

It should be noted that, the terms "a" and "multiple" mentioned in the present disclosure are schematic rather than restrictive, and should be understood as "one or more" by those skilled in the art, otherwise explicitly illustrated in the context.

Names of messages or information interacted between multiple apparatuses in the embodiments of the present disclosure are illustrative rather than limit the scope of the message or information.

Figure 1:
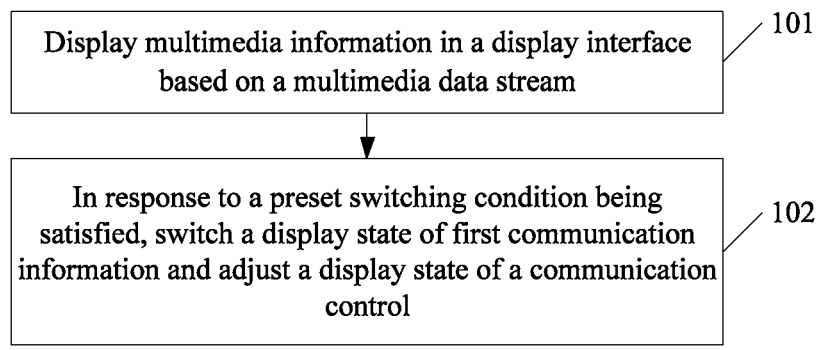
FIG. 1 is a flowchart of a human-computer interaction method according to an embodiment of the present disclosure.

Reference is made to FIG. 1, which is a flowchart of a human-computer interaction method according to an embodiment of the present disclosure. As shown in FIG. 1, the human-computer interaction method includes the steps 101 to 102.

Step 101, display multimedia information in a display interface based on a multimedia data stream.

In this embodiment, an execution body performing the human-computer interaction method (for example, the terminal devices 601 and 602 shown in FIG. 6) may display the multimedia information in the display interface based on the multimedia data stream.

Here, the multimedia data stream may be an audio data stream and/or a video data stream.

It is not difficult to understand that the multimedia information may be information contained in the multimedia data stream. It should be understood that the display interface may be an interface for displaying the multimedia information.

In some scenarios, the above-mentioned execution body may determine the multimedia information contained in the multimedia data stream. Further, the above-mentioned execution body may display the determined multimedia information in the display interface.

Step 102, in response to a preset switching condition being satisfied, switch a display state of first communication information and adjust a display state of a communication control, where the communication control is used for inputting communication information.

In this embodiment, the above-mentioned execution body may determine whether the preset switching condition is satisfied.

Here, the switching condition may be a condition for switching the display state of the first communication information.

In practice, the communication information may be various kinds of information published when users communicate. For example, the communication information may include, but is not limited to, at least one of text, images, links, and the like.

In some scenarios, the above-mentioned execution body may determine a time period during which the user does not input the first communication information. In response to the time period, during which the user does not input the first communication information, exceeding a preset duration threshold, the above-mentioned execution body determines that the above-mentioned switching condition is satisfied. Otherwise, the above-mentioned execution body determines that the above-mentioned switching condition is not satisfied.

In this embodiment, in response to the switching condition being satisfied, the above-mentioned execution body may switch the display state of the first communication information.

In some scenarios, the above-mentioned execution body may switch the display state of the first communication information from a displaying state to a hiding state.

In other scenarios, the above-mentioned execution body may switch the display state of the first communication information from the hiding state to the displaying state.

In this embodiment, in response to the switching condition is satisfied, the above-mentioned execution body may further adjust the display state of the communication control.

Here, the communication control is used for inputting communication information.

In some scenarios, the above-mentioned execution body may adjust the display state of the communication control from the hiding state to the displaying state.

In other scenarios, the above-mentioned execution body may adjust the display state of the communication control from the displaying state to the hiding state.

Figure 2:
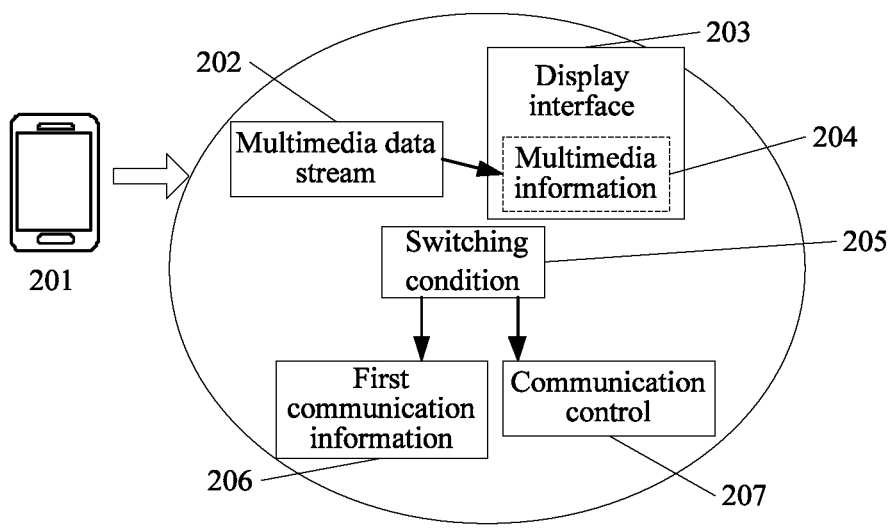
FIG. 2 is a schematic diagram of an application scenario of the human-computer interaction method according to the present disclosure.

Reference is made to FIG. 2, which is a schematic diagram of an application scenario of the human-computer interaction method according to the present disclosure. As shown in FIG. 2, a terminal device 201 may display multimedia information 204 in a display interface 203 based on a multimedia data stream 202. Further, the terminal device 201 may determine whether a preset switching condition 205 is satisfied. Still further, in response to the switching condition 205 being satisfied, the terminal device 201 may switch a display state of the first communication information 206, and the terminal device 201 may adjust a display state of a communication control 207.

In order to realize user communication, as described in the background art, in the related art, the communication information published by the user may be displayed in the display interface of multimedia information. It is not difficult to understand that because the display state of the communication information cannot be switched, a display flexibility of the communication information is low.

In this embodiment, in response to the preset switching condition being satisfied, the display state of the first communication information is switched, and the display state of the first communication information published by the user may be switched during the process of displaying the multimedia information. Therefore, by switching the display state of the first communication information, the display flexibility of the first communication information is improved. In addition, by adjusting the display state of the communication control for inputting communication information, the display flexibility of the communication control can be improved.

In some embodiments, the first communication information is displayed in a first preset display area. The above-mentioned execution body may detect a predetermined operation performed by the user on the first preset display area at 802 as shown in FIG. 8.

The predetermined operation may include various operations performed by the user on the first preset display area. Optionally, the predetermined operation includes at least one of a cursor hovering operation, a clicking operation, and a sliding operation.

The cursor hovering operation may be an operation of hovering a cursor at a position where the first preset display area is located. The clicking operation may be an operation of clicking or double-clicking the first preset display area. The sliding operation may be an operation of sliding the first preset display area along a predetermined direction. In practice, the predetermined direction may be set according to specific requirements. For example, the predetermined direction may be a direction from the bottom of a screen to the top of the screen.

Figure 8:
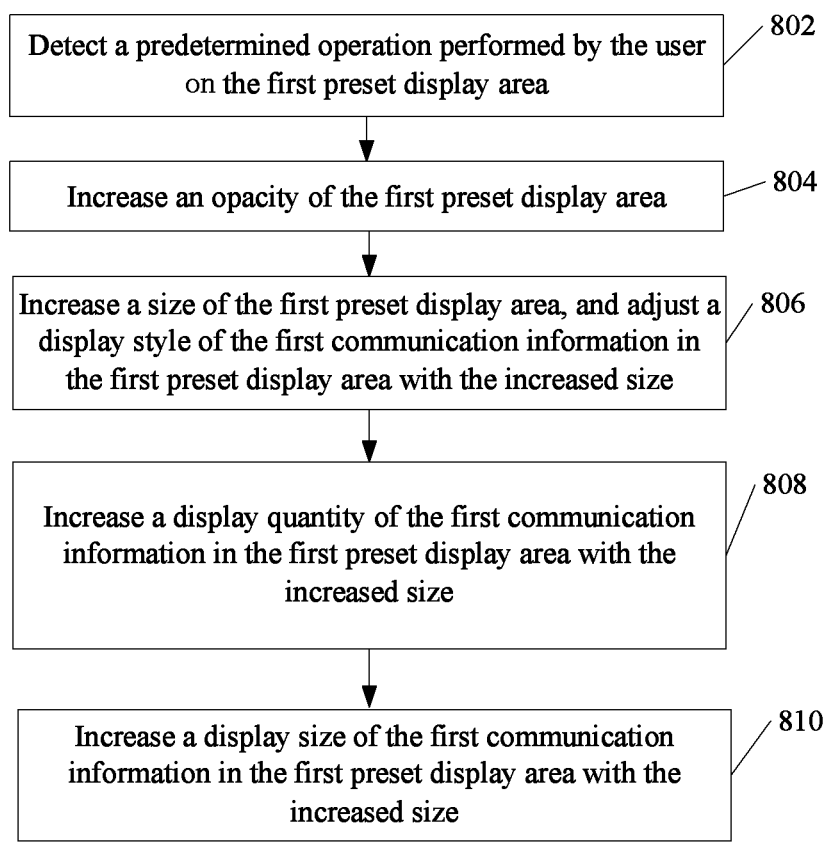
FIG. 8 is an example process in accordance with the present disclosure.

Further, in response to a predetermined operation on the first preset display area, the above-mentioned execution body may perform at least one of the following steps as shown in FIG. 8:

Step 804, increase an opacity of the first preset display area.

The above-mentioned execution body may increase the opacity of the first preset display area in various ways. In some scenarios, the opacity of the first preset display area may be directly increased to a target opacity. In other scenarios, the opacity of the first preset display area may be gradually increased to the target opacity. The target opacity may be, for example, the maximum opacity (i.e., 100%).

By increasing the opacity of the first preset display area, the first preset display area can be distinguished from the display interface more intuitively. The first communication information may be regarded as a part of the first preset display area. Therefore, by increasing the opacity of the first preset display area, the first communication information can be more clearly distinguished from the display interface.

Step 806, increase a size of the first preset display area, and adjust a display style of the first communication information in the first preset display area with the increased size.

The above-mentioned execution body may adjust the display style of the first communication information, in the first preset display area with the increased size, by multiple manners.

In a first optional manner, the above-mentioned execution body may increase a display quantity of the first communication information in the first preset display area with the increased size at step 808.

It can be understood that the first preset display area with the increased size may display more pieces of the first communication information.

It can be seen that when the user performs the predetermined operation on the first preset display area, the size of the first preset display area may be increased, and more pieces of the first communication information may be displayed in the first preset display area. Therefore, by increasing the size of the first preset display area, a larger amount (content) of the first communication information is displayed to the user.

In a second optional manner, the above-mentioned execution body may increase a display size of the first communication information in the first preset display area with the increased size at step 810.

The above executive body may increase the display size of the first communication information by multiple manners. In some scenarios, the display size of the first communication information may be increased to a target display size (larger than a current display size). In other scenarios, the display size of the first communication information may be correspondingly increased according to an increased multiple of the size of the first preset display area.

It can be seen that when the user performs the predetermined operation on the first preset display area, the size of the first preset display area may be increased, and the first communication information with a larger size is displayed in the first preset display. Therefore, by increasing the first communication information, the first communication information with a larger size is displayed to the user.

In conclusion, by increasing the opacity and/or size of the first preset display area, the user experience of browsing the first communication information can be improved during the process of displaying multimedia information.

In some optional implementations of this embodiment, the communication control includes at least one of a first input control and a second input control.

In these implementations, the display states of the first communication control and the second communication control may be adjusted when the display state of the communication control is adjusted.

In some optional implementations of this embodiment, the above-mentioned execution body may switch the display state of the first communication information and adjust the display state of the communication control in the following manner.

Specifically, in response to hiding the first communication information, the first input control is hidden and the second input control is displayed.

In these implementations, the first input control is hidden and the second input control is displayed when the first communication information is hidden.

In some optional implementations of this embodiment, the above-mentioned execution body may switch the display state of the first communication information and adjust the display state of the communication control in the following manner.

Specifically, in response to displaying the first communication information, the first input control and the second input control are displayed.

In these implementations, the first input control and the second input control are displayed when the first communication information is displayed.

In some optional implementations of this embodiment, the above switching condition includes: detecting a triggering operation on a preset switching control.

Here, the preset switching control may be a control for switching the display state of the first communication information.

In these implementations, the display state of the first communication information is switched and the display state of the communication control is adjusted when a triggering operation on the preset switching control is detected.

In some optional implementations of this embodiment, the second input control is used for inputting quick communication information.

Here, the quick communication information may be communication information that does not require user editing. In some scenarios, the quick communication information may be emoticon information (for example, an icon describing an emoticon).

In these implementations, when the above switching condition is satisfied, the display state of the second input control for the emoticon information may be adjusted.

In some optional implementations of this embodiment, the second input control is used for inputting second communication information.

Here, the above-mentioned execution body may also perform the following steps.

Specifically, the second communication information is displayed in a second preset display area.

In these implementations, the second communication information inputted for the second input control may be displayed in the second preset display area.

In some optional implementations of this embodiment, the above-mentioned execution body may further perform following steps 1 and 2.

Step 1, determine a quantity or identification information of newly added first communication information pushed by a server, in a case that the first communication information of the user is hidden.

It is not difficult to understand that the newly added first communication information may be first communication information which is added newly.

Here, the identification information may be information for identifying the newly added first communication information. For example, text information is "newly added quantity 6", the "newly added quantity" is the identification information. "6" is the quantity of newly added first communication information.

Step 2, display the quantity or the identification information in a preset area.

It is not difficult to understand that the preset area may be an area for displaying the above-mentioned quantity and the above-mentioned identification information.

In these implementations, the quantity and the identification information of the newly added first communication information may still be displayed when the first communication information is hidden.

Figure 9:
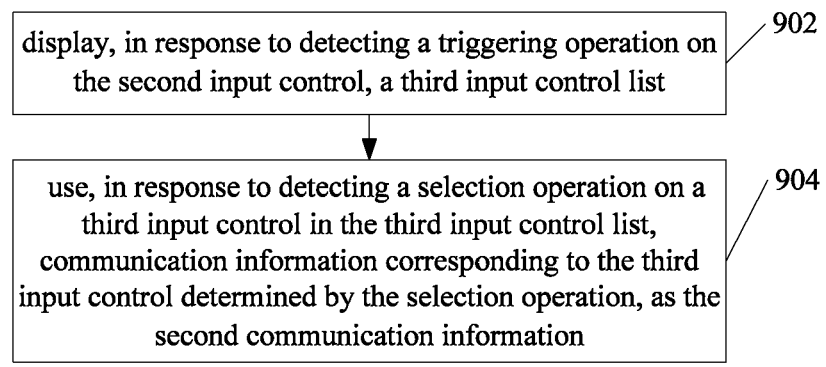
FIG. 9 is another example process in accordance with the present disclosure.

In some optional implementations of this embodiment, the above-mentioned execution body may further perform the steps as shown in FIG. 9.

Step 902, display, in response to detecting a triggering operation on the second input control, a third input control list.

In some scenarios, the above-mentioned execution body may detect the triggering operation on the second input control through a built-in detection program.

It is not difficult to understand that the third input control list may be a list including multiple third input controls.

In some scenarios, the third input controls in the third input control list are arranged in a preset sequence.

Step 904, use, in response to detecting a selection operation on a third input control in the third input control list, communication information corresponding to the third input control determined by the selection operation as the second communication information.

It is not difficult to understand that the selection operation may be an operation of selecting the third input control from the third input control list.

It is not difficult to understand that the third input control determined by the selection operation may be the third input control selected from the third input control list.

In these implementations, the second communication information is determined according to the third input control selected from the third input control list. The communication information corresponding to the selected third input control is displayed in the second preset display area.

Figure 10:
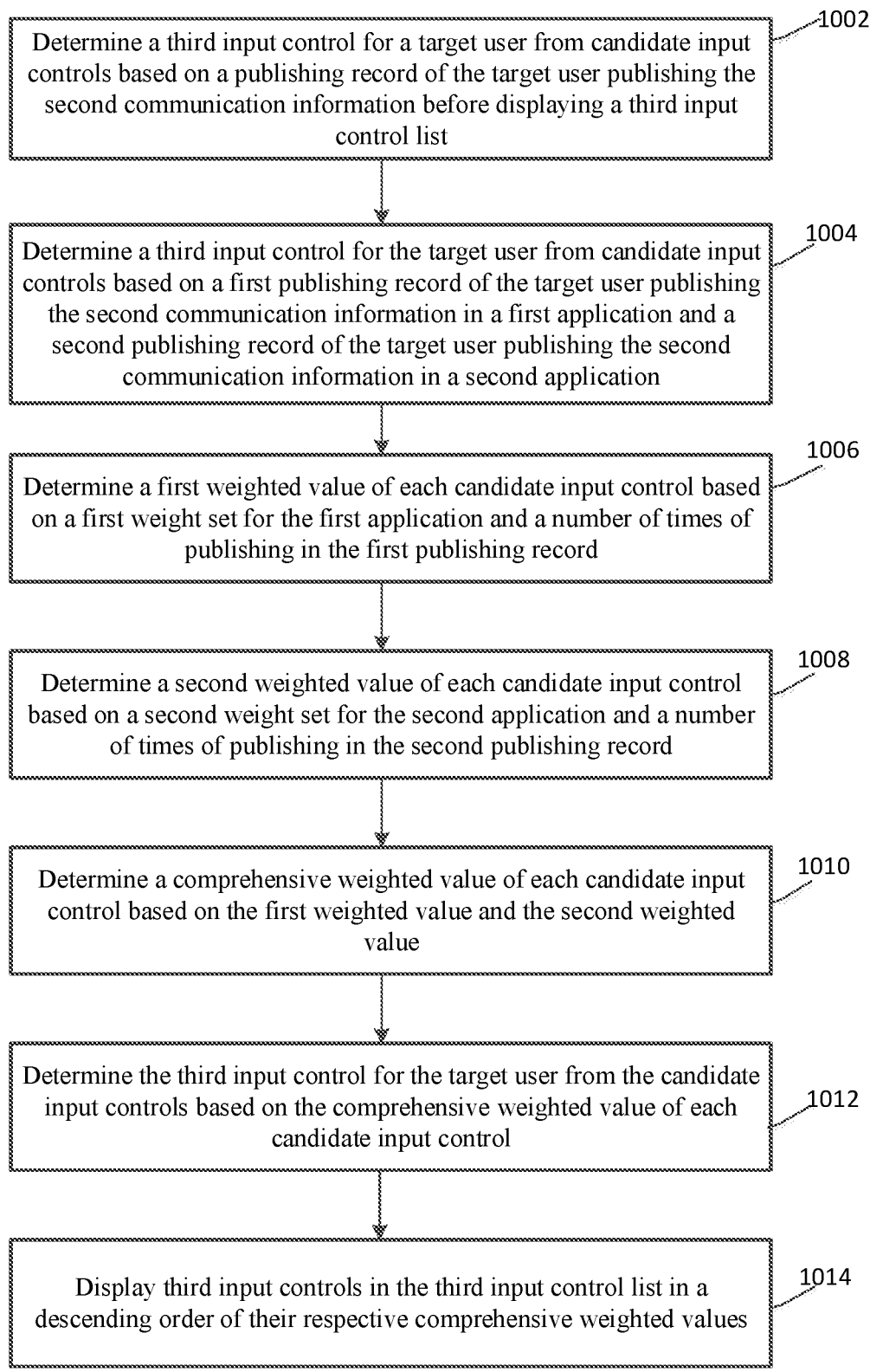
FIG. 10 is a further example process in accordance with the present disclosure.

In some optional implementations of this embodiment, before displaying the third input control list, the above-mentioned execution body may further perform the following steps as shown in FIG. 10.

Specifically, a third input control for a target user is determined from candidate input controls based on a publishing record of the target user publishing the second communication information at step 1002 of FIG. 10.

Here, the target user is a locally logged-in user.

It is not difficult to understand that the publishing record may be a record of the target user publishing the second communication information.

In some scenarios, the execution body may determine the number of times the target user publishes the second communication information based on the publishing record. Further, the above-mentioned execution body may determine the third input control for the target user from the candidate input controls in a descending order of the number of times of publishing.

In these implementations, the third input control in the third input control list, which is to be displayed, is determined based on the publishing record of the target user publishing the second communication information.

In some optional implementations of this embodiment, the publishing record includes a first publishing record and/or a second publishing record, where the first publishing record is a publishing record in a first application, and the second publishing record is a publishing record in a second application.

In these implementations, the third input control in the third input control list, which is to be displayed, may be determined based on the first publishing record of the target user publishing the second communication information in the first application and the second publishing record of the target user publishing the second communication information in the second application at step 1004 of FIG. 10.

In some optional implementations of this embodiment, the publishing record includes the number of times of publishing.

It is not difficult to understand that the number of times of publishing may be the number of times that the target user publishes the second communication information.

Here, the above-mentioned execution body may determine the third input control for the target user by the following steps as shown in FIG. 10.

Step 1006, determine a first weighted value of each candidate input control published by the target user based on a first weight set for the first application and the number of times of publishing in the first publishing record.

In some scenarios, for each candidate input control published by the target user, the above-mentioned execution body may perform the following steps. First, a product of the first weight set for the first application and the number of times of publishing the candidate input control in the first publishing record may be determined. Then, the determined product may be used as the first weighted value of the candidate input control.

Step 1008, determine a second weighted value of each candidate input control published by the target user based on a second weight set for the second application and the number of times of publishing in the second publishing record.

In some scenarios, for each candidate input control published by the target user, the above-mentioned execution body may perform the following steps. First, a product of the second weight set for the second application and the number of times of publishing the candidate input control in the second publishing record may be determined. Then, the determined product may be used as the second weighted value of the candidate input control.

Step 1010, determine a comprehensive weighted value of each candidate input control based on the first weighted value and the second weighted value.

In some scenarios, for each candidate input control published by the target user, the above-mentioned executive body may determine the sum of the first weighted value and the second weighted value of the candidate input control, and further, the above-mentioned execution body may use the determined sum as the comprehensive weighted value of the candidate input control.

Step 1012, determine the third input control for the target user from the candidate input controls based on the comprehensive weighted values.

In some scenarios, the above-mentioned execution body may determine the third input control for the target user from the candidate input controls in a descending order of the comprehensive weighted values.

In these implementations, the third input control in the third input control list, which is to be displayed, is determined based on the comprehensive weighted values of the candidate input controls.

In some optional implementations of this embodiment, displaying the third input controls in the third input control list in a descending order of the comprehensive weighted values at step 1014 shown in FIG. 10.

In these implementations, the candidate input controls may be displayed based on the comprehensive weighted values of the candidate input controls when displaying the third input control list.

Figure 11:
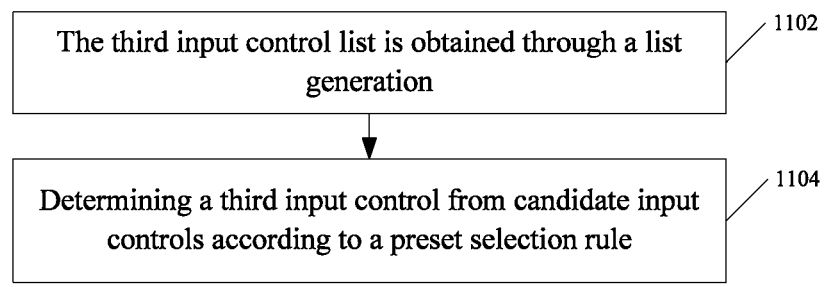
FIG. 11 is another example process in accordance with the present disclosure.

In some optional implementations of this embodiment, the third input control list is obtained through a list generation step 1102 as shown in FIG. 11, where the list generation step includes: determining a third input control from candidate input controls according to a preset selection rule at step 1104 shown in FIG. 11.

In these implementations, the third input control to be displayed in the third input control list may be determined according to a preset selection rule.

Figure 3:
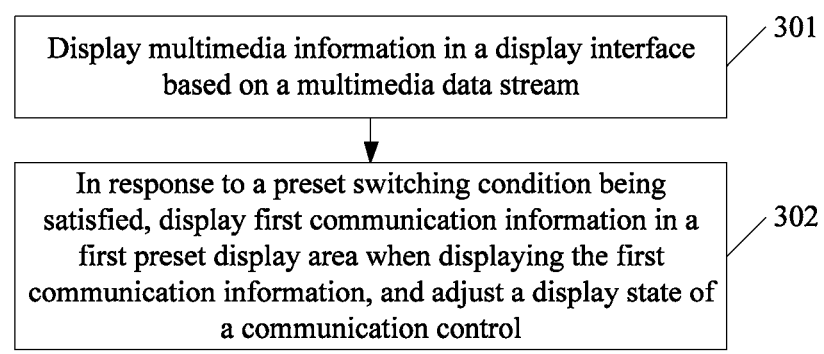
FIG. 3 is a flowchart of a human-computer interaction method according to another embodiment of the present disclosure.

Reference is made to FIG. 3, which is a flowchart of a human-computer interaction method according to another embodiment of the present disclosure. As shown in FIG. 3, the human-computer interaction method includes the following steps 301 and 302.

Step 301: display multimedia information in a display interface based on a multimedia data stream.

The above-mentioned step 301 may be performed in a similar manner to step 101 in the embodiment shown in FIG. 1, and the above description for step 101 is also applicable to step 301, and details are not repeated here.

Step 302: in response to a preset switching condition being satisfied, display first communication information in a first preset display area when displaying the first communication information, and adjust a display state of a communication control.

In this embodiment, in response to the preset switching condition being satisfied, an execution body performing the human-computer interaction method (for example, the terminal devices 601 and 602 shown in FIG. 6) may display the first communication information in the first preset display area when displaying the first communication information. Here, the display state includes a displaying state or a hiding state.

It is not difficult to understand that the display area may be an area where the communication information is displayed.

The above-mentioned first preset display area includes at least two display subsections, each subsection is used for displaying one piece of communication information or communication information of one user.

In this embodiment, in response to the preset switching condition being satisfied, the above-mentioned execution body may adjust the display state of the communication control.

In some scenarios, the above-mentioned execution body may adjust the display state of the communication control in a manner similar to that described in step 102, which is not be repeated here.

In this embodiment, there are at least two display subsections, and the first communication information is displayed in the first preset display area when displaying the first communication information.

Figure 4A:
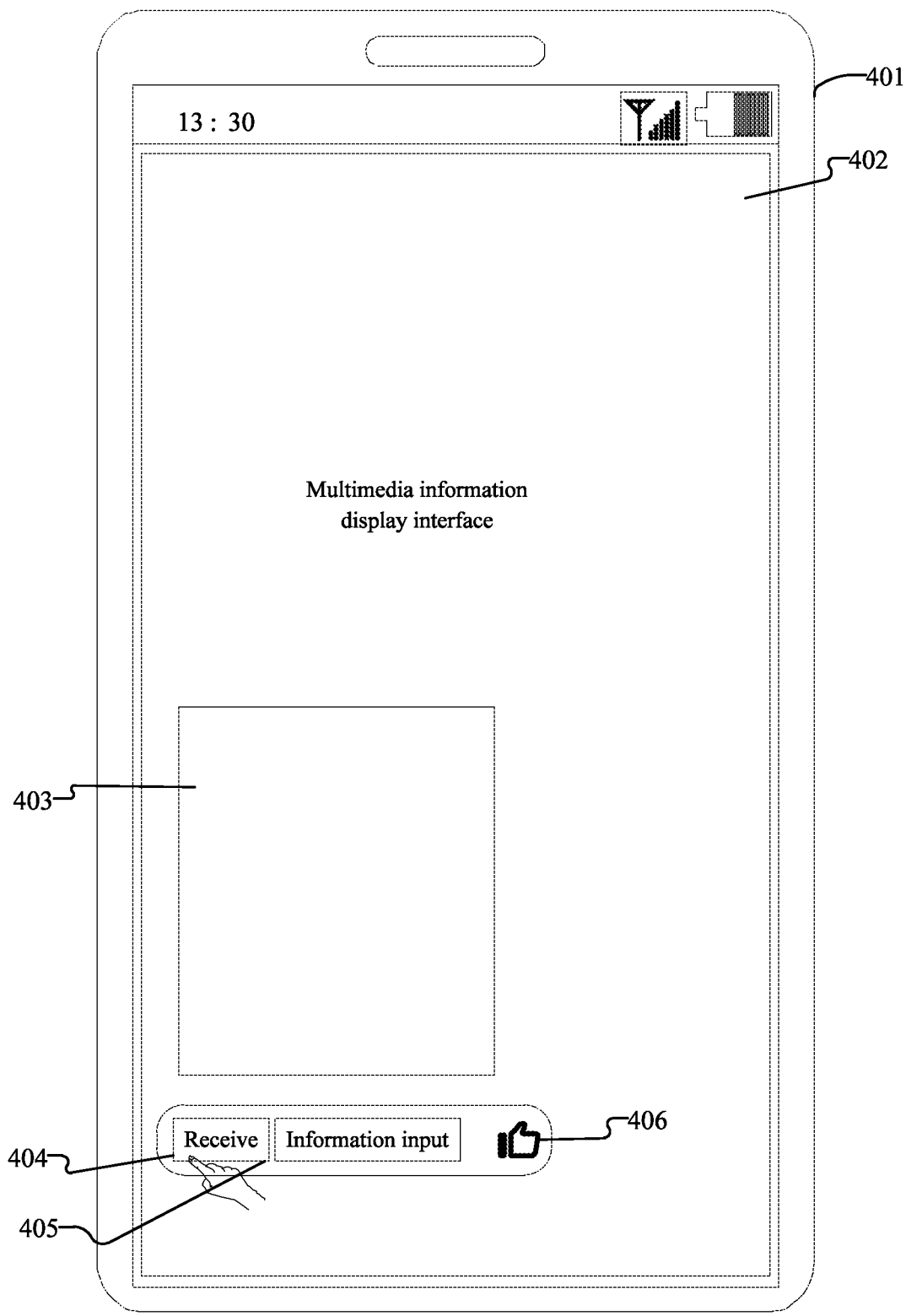
FIGS. 4A and 4B are schematic diagrams of an application scenario of the human-computer interaction device according to the present disclosure.
Figure 4B:
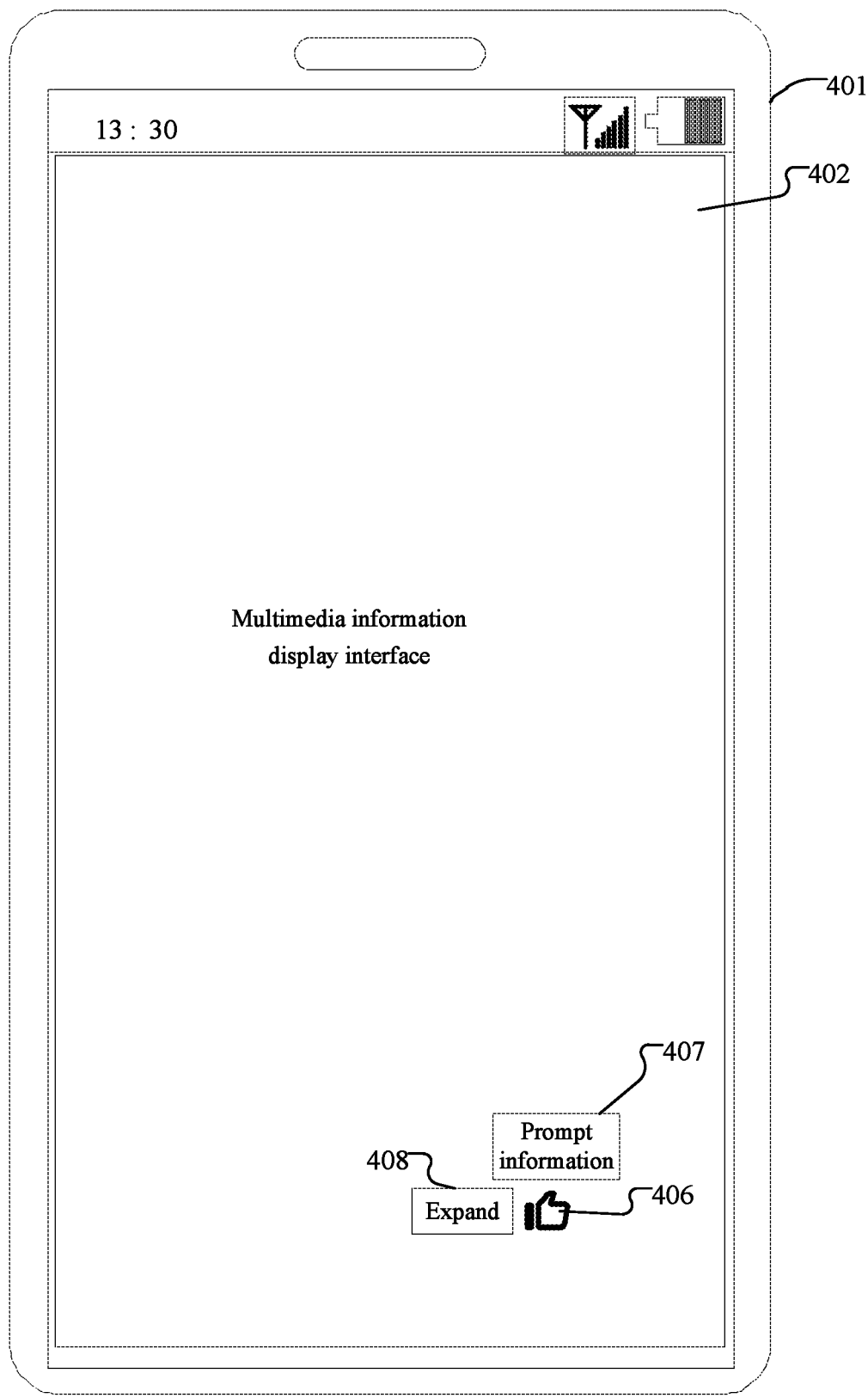

In FIG. 4A, in a display interface 402 of a user terminal device 401 for displaying multimedia information, first communication information is displayed in a first preset display area 403. Communication information input controls may be displayed in the display interface 402. The communication information input controls include a text communication information input control for inputting text communication information, such as an information input control 405 shown in FIG. 4A, and an emoticon information input control 406 for inputting emoticon communication information. In addition, the above-mentioned communication input control further includes a receiving control 404 for receiving the first preset display area 403. The receiving control here may represent any identifier for instructing to receive the first preset display area. The above-mentioned identifier may include words, symbols, icons, and the like. The user may perform a triggering operation on the receiving control 404 through operations such as clicking, touch, to switch the display state of the above-mentioned first preset display area 403. Here, the first preset display area 403 is received. Thus, the first preset display area 403 is switched from the displaying state to the hiding state. As shown in FIG. 4B, the first preset display area 403 is in the hiding state. In FIG. 4B, the first preset display area 403 is in the hiding state. The emoticon information input control 406 may be displayed in the above-mentioned display interface. When the first preset display area 403 is in the hiding state, a display area 407 for displaying prompt information of the currently received new communication information may be displayed in the above-mentioned display interface. The prompt information here may include characters, numbers, etc. for prompting the receipt of new communication information. As an example, the prompt information may be a number for characterizing the number of pieces of newly received communication information. In addition, when the first preset display area 403 is in the hiding state, an expansion control 408 for expanding the above-mentioned first preset display area 403 may also be displayed in the above-mentioned display interface. The user may perform a triggering operation on the expansion control 408 through operations such as clicking, touch, to switch the display state of the first preset display area 403 described above. Here, the first preset display area 403 is expanded. Thus, the first preset display area 403 is switched from the hiding state to the displaying state.

In some optional implementations of this embodiment, the above-mentioned execution body may display the first communication information in the first preset display area in the following manner.

Specifically, the communication information displayed in each display subsection is adjusted based on received newly added communication information.

In some scenarios, the above-mentioned execution body may detect a display time period of the communication information displayed in each display subsection through a built-in detection program. Further, the above-mentioned execution body may determine the display subsection with the greatest display time period from the display subsections. Still further, the above-mentioned execution body may display the newly added communication information in the display subsection with the greatest display time period.

In these implementations, the display of newly added communication information is realized by adjusting the communication information in each display subsection.

In some optional implementations of this embodiment, the above-mentioned execution body may adjust the communication information in each display subsection in the following manner.

Specifically, the communication information displayed in each display subsection is moved from a current display subsection to a target display subsection according to a preset moving direction, where the newly added communication information is displayed in a preset display subsection.

Here, the moving direction may be the direction in which the communication information moves from the previous display subsection to the next display subsection.

The target display subsection may be the next display subsection to which the communication information moves from the current display subsection.

In these implementations, the communication information displayed in each display subsection is moved according to the preset moving direction, so as to adjust the communication information in each display subsection.

Figure 5:
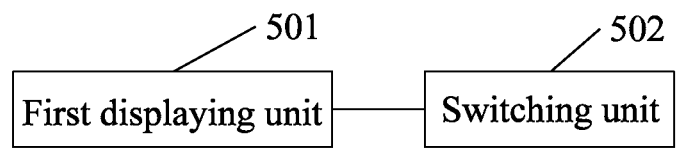
FIG. 5 is a schematic structural diagram of a human-computer interaction device according to an embodiment of the present disclosure.

Reference is made to FIG. 5, as an implementation of the methods described above, the present disclosure provides an embodiment of a human-computer interaction device, the device embodiment corresponds to the display method embodiment shown in FIG. 1, and the device may specifically be used in various electronic devices.

As shown in FIG. 5, the human-computer interaction device according to the embodiment includes: a first displaying unit 501, configured to display multimedia information in a display interface based on a multimedia data stream; and a switching unit 502, configured to, in response to a preset switching condition being satisfied, switch a display state of first communication information and adjust a display state of a communication control, where the communication control is used for inputting communication information.

In this embodiment, the specific processing of the first displaying unit 501 and the switching unit 502 of the human-computer interaction device and the technical effects brought by the units may refer to the relevant descriptions of steps 101 and 102 in the corresponding embodiment of FIG. 1 respectively, which will is not repeated here.

In some optional implementations of this embodiment, the display state includes a displaying state or a hiding state; and the switching unit 502 is further configured to display the first communication information in a first preset display area when displaying the first communication information, where the first preset display area includes at least two display subsections, each subsection is used for displaying one piece of communication information or communication information of one user.

In some optional implementations of this embodiment, the switching unit 502 is further configured to adjust the communication information displayed in each display subsection based on received newly added communication information.

In some optional implementations of this embodiment, the switching unit 502 is further configured to move the communication information displayed in each display subsection from a current display subsection to a target display subsection according to a preset moving direction, where the newly added communication information is displayed in a preset display subsection.

In some optional implementations of this embodiment, the communication control includes at least one of a first input control and a second input control.

In some optional implementations of this embodiment, the switching unit 502 is further configured to, in response to hiding the first communication information, hide the first input control and display the second input control.

In some optional implementations of this embodiment, the switching unit 502 is further configured to, in response to displaying the first communication information, display the first input control and the second input control.

In some optional implementations of this embodiment, the switching condition includes: detecting a triggering operation on a preset switching control.

In some optional implementations of this embodiment, the second input control is used for inputting quick communication information.

In some optional implementations of this embodiment, the second input control is used for inputting second communication information, and the human-computer interaction device further includes a second displaying unit (not shown in the drawing) configured to display the second communication information in a second preset display area.

In some optional implementations of this embodiment, the human-computer interaction device further includes a third displaying unit (not shown in the drawing) configured to: determine a quantity or identification information of newly added first communication information pushed by a server, in a case that the first communication information is in a hiding state; and display the quantity or the identification information in a preset area.

In some optional implementations of this embodiment, the human-computer interaction device further includes a selecting unit (not shown in the drawing) configured to: display, in response to detecting a triggering operation on the second input control, a third input control list; and use, in response to detecting a selection operation on a third input control in the third input control list, communication information corresponding to the third input control determined by the selection operation, as the second communication information.

In some optional implementations of this embodiment, the human-computer interaction device further includes a determining unit (not shown in the drawing) configured to determine a third input control for a target user from candidate input controls based on a publishing record of the target user publishing the second communication information, where the target user is a locally logged-in user.

In some optional implementations of this embodiment, the publishing record includes a first publishing record and/or a second publishing record, where the first publishing record is a publishing record in a first application, and the second publishing record is a publishing record in a second application.

In some optional implementations of this embodiment, the publishing record includes the number of times of publishing, and the determining unit is further configured to: determine a first weighted value of each candidate input control published by the target user based on a first weight set for the first application and the number of times of publishing in the first publishing record; determine a second weighted value of each candidate input control published by the target user based on a second weight set for the second application and the number of times of publishing in the second publishing record; determine a comprehensive weighted value of each candidate input control based on the first weighted value and the second weighted value; and determine the third input control for the target user from the candidate input controls based on the comprehensive weighted values.

In some optional implementations of this embodiment, a display order of the third input controls in the third input control list is a descending order of the comprehensive weighted values.

In some optional implementations of this embodiment, the third input control list is obtained through a list generation step, where the list generation step includes: determining a third input control from candidate input controls according to a preset selection rule.

In some optional implementations of this embodiment, the first communication information is displayed in a first preset display area; the human-computer interaction device further includes a performing unit (not shown in the drawing) configured to: perform, in response to a predetermined operation on the first preset display area, at least one of: increasing an opacity of the first preset display area; and increasing a size of the first preset display area, and adjusting a display style of the first communication information in the first preset display area with the increased size.

In some optional implementations of this embodiment, the performing unit is further configured to perform any one of: increasing a display quantity of the first communication information in the first preset display area with the increased size; and increasing a display size of the first communication information in the first preset display area with the increased size.

In some optional implementations of this embodiment, the predetermined operation includes at least one of: a cursor hovering operation, a clicking operation, and a sliding operation.

Figure 6:
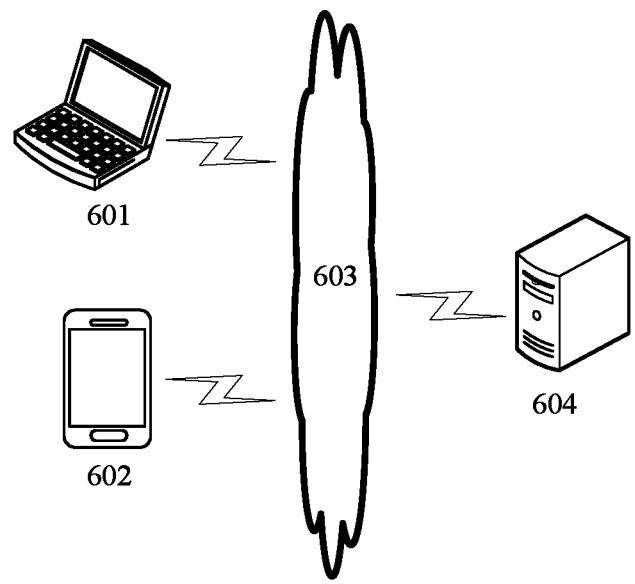
FIG. 6 is an exemplary system architecture to which a human-computer interaction method according to an embodiment of the present disclosure may be applied.

Reference is made to FIG. 6, which is an exemplary system architecture to which a human-computer interaction method according to an embodiment of the present disclosure may be applied.

As shown in FIG. 6, the system architecture may include terminal devices 601, 602, a network 603, and a server 604. The network 603 is a medium used to provide a communication link between the terminal devices 601, 602 and the server 604. The network 603 may include various connection types, such as wired, wireless communication links, or fiber optic cables.

The terminal devices 601, 602 may interact with the server 604 through the network 603 to receive or send messages and the like. Various client applications, such as a multimedia conference application, a shopping application, a search application, may be installed on the terminal devices 601, 602. In some scenarios, the terminal devices 601 and 602 may display multimedia information in the display interface. The terminal devices 601 and 602 may also switch the display state of the first communication information, and adjust the display state of the communication control.

The terminal devices 601, 602 may be hardware or software. When the terminal devices 601, 602 are hardware, they may be various electronic devices that have a display screen and support information interaction, including but not limited to smart phones, tablet computers, laptops and desktops, etc. When the terminal devices 601, 602 are software, they may be installed in the electronic devices listed above. They may be implemented as multiple software or software modules, or may be implemented as a single software or software module, which is not limited here.

The server 604 may be a server that can provide various services. In some scenarios, the server 604 may forward the communication information to the terminal devices 601 and 602.

The server 604 may be hardware or software. When the server 604 is hardware, it may be implemented as a distributed server cluster composed of multiple servers, or may be implemented as a single server. When the server 604 is software, it may be implemented as multiple software or software modules (for example, multiple software or software modules for providing distributed services), or may be implemented as a single software or software module. There is no specific limitation here.

It should be noted that the human-computer interaction method provided by the embodiments of the present disclosure may be executed by the terminal devices 601 and 602, and correspondingly, the human-computer interaction device may be provided in the terminal devices 601 and 602.

It should be understood that the numbers of terminal devices, networks and servers in FIG. 6 are merely illustrative. There may be any number of terminal devices, networks and servers according to implementation needs.

Figure 7:
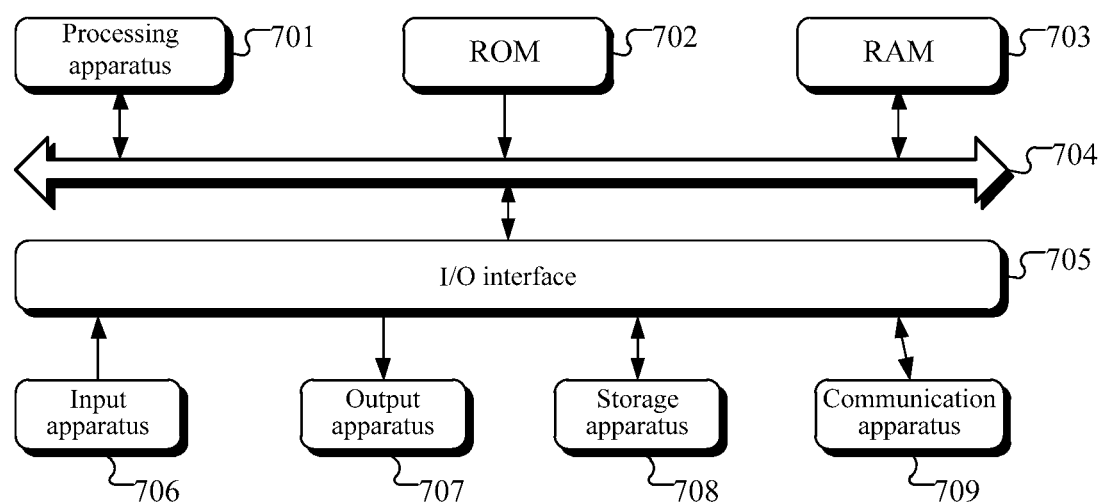
FIG. 7 is a schematic diagram of a basic structure of an electronic device according to an embodiment of the present disclosure.

Reference is made to FIG. 7 which shows a schematic structural diagram of an electronic device (such as terminal devices in FIG. 6) for implementing the embodiments of the present disclosure. The terminal device in the embodiments of the present disclosure may include but not limited to mobile terminals such as a mobile phone, a notebook computer, a digital broadcast receiver, a personal digital assistance (PDA), a tablet computer (PAD), a portable multi-media player (PMP) and a vehicle terminal (such as a vehicle navigation terminal); and fixed terminals such as digital TV and a desktop computer. The electronic device shown in FIG. 7 is schematic, and is not intended to limit functions and scope of the embodiments of the present disclosure.

As shown in FIG. 7, the electronic device may include a processing apparatus (such as a central processor and a graphic processor) 701. The processing apparatus may perform various appropriate actions and processing by executing programs stored in a read-only memory (ROM) 702 or programs uploaded from a storage apparatus 708 to a random access memory (RAM) 703. Various programs and data required for operations of the electronic device are also stored in the RAM 703. The processing apparatus 701, the ROM 702 and the RAM 703 are connected to each other through the bus 704. An input/output (I/O) interface 705 is also connected to the bus 704.

Generally, the following components are connected to the I/O interface 705: an input apparatus 706 such as a touch screen, a touch panel, a keyboard, a mouse, a camera, a microphone, an accelerometer, and gyroscope; an output apparatus 707 such as a liquid crystal display (LCD), a loudspeaker and a vibrator; a storage apparatus 708 such as a magnetic tape and a hard disk; and a communication apparatus 709. The communication apparatus 709 may allow the electronic device to communicate with other device in a wired or wireless manner to exchange data. Although FIG. 7 shows the electronic device provided with various apparatuses, it should be understood that not all shown apparatuses are necessary. Alternatively, more or less apparatuses may be included. Each block shown in FIG. 7 may represent one device, and may also represent multiple devices as required.

According to the embodiments of the present disclosure, a process described in the flowchart may be implemented by computer software programs. For example, according to an embodiment of the present disclosure, a computer program product including computer program carried on a non-transient computer readable medium is provided. The computer program includes program codes for performing the method shown in the flowchart. In such embodiment, the computer program may be downloaded and installed from the network through the communication apparatus 709, installed from the storage apparatus 708 or installed from the ROM 702. The computer program is executed by the processing apparatus 701 to perform functions defined in the methods described in the embodiments of the present disclosure.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof. In some embodiments of the present disclosure, the computer readable storage medium may be a tangible medium including or storing programs. The programs may be used by an instruction execution system, apparatus or device, or may be used in combination with the instruction execution system, apparatus or device. In some embodiments of the present disclosure, a computer readable signal medium may include a data signal in a baseband or propagated as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs used by the instruction execution system, apparatus or device or the programs used in combination with the instruction execution system, apparatus or device. The program code included in the computer readable medium may be transmitted via any appropriate medium, including but not limited to an electric wire, an optical fiber, radio frequency (RF) or any appropriate combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The computer readable storage medium may be included in the electronic device, or the computer readable storage medium may be independent from the electronic device, i.e., not being installed in the electronic device. The computer readable medium carries one or more programs. The one or more programs, when executed by the electronic device, cause the electronic device to: display multimedia information in a display interface based on a multimedia data stream; and in response to a preset switching condition being satisfied, switch a display state of first communication information and adjust a display state of a communication control, where the communication control is used for inputting communication information.

Computer program codes for performing operations of embodiments of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams shown in the drawings show a system architecture, function and operation which may be implemented by the system, method and computer program product according to the embodiments of the present disclosure. Each block in the flowcharts or the block diagram may represent a part of a module, a program section or codes including executable instructions for implementing specified logic functions. It should be noted that, in alternative embodiment, functions denoted in the blocks may be performed in an order different from the order denoted in the drawing. For example, operations in two blocks connected successively may be performed in parallel, or may be performed in an opposite order, depending on the involved function. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Units involved in the embodiments of the present disclosure may be implemented by software or hardware. Names of the units do not limit the units in a certain case. For example, the first displaying unit may also be described as "a unit for displaying multimedia information in a display interface based on a multimedia data stream".

The functions described above may be partially performed by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD) and so on.

In the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

The preferred embodiments and the technical principles of the present disclosure are described above. It should be understood by those skilled in the art that, the protection scope of the present disclosure is not limited to the technical solutions formed by specific combination of the above technical features, and other technical solutions formed by random combinations of the above technical features or equivalent features without departing from the concept of the present disclosure also fall within the protection scope of the present disclosure, for example the technical solution formed by replacement between the above technical features and technical features with similar functions disclosed (not limited) in the present disclosure.

The invention claimed is:

1. A human-computer interaction method, comprising:
   displaying multimedia information in a display interface based on a multimedia data stream;
   in response to a preset switching condition being satisfied, switching a display state of first communication information and adjusting a display state of a communication control, wherein the communication control is used for inputting communication information, and wherein the communication control comprises a second input control configured to input second communication information;
   displaying a third input control list in response to detecting a triggering operation on the second input control;
   wherein before the displaying a third input control list, the method further comprises:
   determining a third input control for a target user from candidate input controls based on a publishing record of the target user publishing the second communication information, wherein the publishing record comprises a number of times of publishing, wherein the publishing record comprises a first publishing record and a second publishing record, wherein the first publishing record is a publishing record in a first application, wherein the second publishing record is a publishing record in a second application, and wherein the determining a third input control for a target user from candidate input controls based on a publishing record of the target user publishing the second communication information further comprises:
   determining a first weighted value of each candidate input control based on a first weight set for the first application and a number of times of publishing in the first publishing record;
   determining a second weighted value of each candidate input control based on a second weight set for the second application and a number of times of publishing in the second publishing record;
   determining a comprehensive weighted value of each candidate input control based on the first weighted value and the second weighted value; and
   determining the third input control for the target user from the candidate input controls based on the comprehensive weighted value of each candidate input control.

2. The method according to claim 1, wherein the display state comprises a displaying state or a hiding state; and
   the switching a display state of first communication information comprises:
   displaying the first communication information in a first preset display area when displaying the first communication information, wherein the first preset display area comprises at least two display subsections, each display subsection is used for displaying one piece of communication information or communication information of one user.

3. The method according to claim 2, wherein the displaying the first communication information in a first preset display area comprises:
   adjusting the communication information displayed in each display subsection based on received newly added communication information.

4. The method according to claim 3, wherein the adjusting the communication information displayed in each display subsection comprises:
   moving the communication information displayed in each display subsection from a current display subsection to a target display subsection according to a preset moving direction, wherein the newly added communication information is displayed in a preset display subsection.

5. The method according to claim 1, wherein the communication control further comprises a first input control.

6. The method according to claim 5, wherein the switching a display state of first communication information, and adjusting a display state of a communication control comprises:
   in response to hiding the first communication information, hiding the first input control and displaying the second input control.

7. The method according to claim 5, wherein the switching a display state of first communication information, and adjusting a display state of a communication control comprises:
in response to displaying the first communication information, displaying the first input control and the second input control.

8. The method according to claim 5, wherein the switching condition comprises: detecting a triggering operation on a preset switching control.

9. The method according to claim 5, wherein the method further comprises:
displaying the second communication information in a second preset display area.

10. The method according to claim 9, further comprising:
in response to detecting a selection operation on the third input control in the third input control list, identifying communication information corresponding to the third input control determined by the selection operation as the second communication information.

11. The method according to claim 10,
wherein the target user is a locally logged-in user.

12. The method according to claim 5, further comprising:
determining a quantity or identification information of newly added first communication information pushed by a server, in a case that the first communication information is in a hiding state; and
displaying the quantity or the identification information in a preset area.

13. The method according to claim 1, wherein a display order of the third input controls in the third input control list is a descending order of the comprehensive weighted values.

14. The method according to claim 1, wherein the third input control list is obtained through a list generation step, wherein the list generation step comprises:
determining a third input control from candidate input controls according to a preset selection rule.

15. The method according to claim 1, wherein the first communication information is displayed in a first preset display area; and the method further comprises:
performing, in response to a predetermined operation on the first preset display area, at least one of:
increasing an opacity of the first preset display area; and
increasing a size of the first preset display area, and adjusting a display style of the first communication information in the first preset display area with the increased size.

16. The method according to claim 15, wherein the adjusting a display style of the first communication information in the first preset display area with the increased size comprises any one of:
increasing a display quantity of the first communication information in the first preset display area with the increased size; and
increasing a display size of the first communication information in the first preset display area with the increased size.

17. The method according to claim 15, wherein the predetermined operation comprises at least one of: a cursor hovering operation, a clicking operation, and a sliding operation.

18. A human-computer interaction device, comprising:
one or more processors;
a storage apparatus storing one or more programs, the one or more programs, when executed by the one or more processors, causing the one or more processors to perform operations of:
displaying multimedia information in a display interface based on a multimedia data stream; and
in response to a preset switching condition being satisfied, switching a display state of first communication information and adjusting a display state of a communication control, wherein the communication control is used for inputting communication information, and wherein the communication control comprises a second input control configured to input second communication information;
displaying a third input control list in response to detecting a triggering operation on the second input control;
wherein before the displaying a third input control list, the operations further comprise:
determining a third input control for a target user from candidate input controls based on a publishing record of the target user publishing the second communication information, wherein the publishing record comprises a number of times of publishing, wherein the publishing record comprises a first publishing record and a second publishing record, wherein the first publishing record is a publishing record in a first application, wherein the second publishing record is a publishing record in a second application, and wherein the determining a third input control for a target user from candidate input controls based on a publishing record of the target user publishing the second communication information further comprises:
determining a first weighted value of each candidate input control based on a first weight set for the first application and a number of times of publishing in the first publishing record;
determining a second weighted value of each candidate input control based on a second weight set for the second application and a number of times of publishing in the second publishing record;
determining a comprehensive weighted value of each candidate input control based on the first weighted value and the second weighted value; and
determining the third input control for the target user from the candidate input controls based on the comprehensive weighted value of each candidate input control.

19. A non-transitory computer-readable medium storing a computer program, the computer program, when executed by a processor, causing the processor to perform operations of:
displaying multimedia information in a display interface based on a multimedia data stream; and
in response to a preset switching condition being satisfied, switching a display state of first communication information and adjusting a display state of a communication control, wherein the communication control is used for inputting communication information, and wherein the communication control comprises a second input control configured to input second communication information;
displaying a third input control list in response to detecting a triggering operation on the second input control;
wherein before the displaying a third input control list, the operations further comprise:
determining a third input control for a target user from candidate input controls based on a publishing record of the target user publishing the second communication information, wherein the publishing record comprises a number of times of publishing, wherein the publishing record comprises a first publishing record and a second publishing record, wherein the first publishing record is a publishing record in a first application, wherein the second publishing record is a publishing record in a second application, and wherein the determining a third input control for a target user from candidate input controls based on a publishing record of the target user publishing the second communication information further comprises:

determining a first weighted value of each candidate input control based on a first weight set for the first application and a number of times of publishing in the first publishing record;

determining a second weighted value of each candidate input control based on a second weight set for the second application and a number of times of publishing in the second publishing record;

determining a comprehensive weighted value of each candidate input control based on the first weighted value and the second weighted value; and determining the third input control for the target user from the candidate input controls based on the comprehensive weighted value of each candidate input control.

* * * * *